United States Patent [19]

Pelley

[11] 4,407,124

[45] Oct. 4, 1983

[54] MEMORY POWER ENGINE

[76] Inventor: Ronald L. Pelley, Box 385, Fillmore, Calif. 93015

[21] Appl. No.: 222,305

[22] Filed: Jan. 5, 1981

[51] Int. Cl.³ .............................................. F03G 7/06
[52] U.S. Cl. ........................................ 60/527; 60/529
[58] Field of Search ......................... 60/527, 528, 529

[56] References Cited
U.S. PATENT DOCUMENTS

| | | | |
|---|---|---|---|
| 3,937,019 | 2/1976 | Renner | 60/527 |
| 4,086,769 | 5/1978 | Smith | 60/527 |
| 4,197,708 | 4/1980 | Milton, Jr. et al. | 60/527 |
| 4,281,513 | 8/1981 | Johnson et al. | 60/527 |

Primary Examiner—Allen M. Ostrager
Assistant Examiner—Stephen F. Husar

[57] ABSTRACT

An engine for conversion of low grade thermal energy into useful rotational energy incorporates a plurality of shape memory elements coupled in series to the crankpins of a crankshaft and to load limiting members. Hot and cold fluids are alternately directed through a sprayer head to the external surfaces of the shape memory elements to provide rotation of the crankshaft.

6 Claims, 3 Drawing Figures

MEMORY POWER ENGINE

FIELD OF THE INVENTION

This invention relates generally to the field of devices for conversion of low grade thermal energy to useful mechanical energy and, more specifically, to engines adapted for such conversion which incorporate shape memory elements.

DESCRIPTION OF THE PRIOR ART

This nation and, indeed, the majority of industrial nations, face a major problem in conservation of energy, a problem commanding sharply increasing priorities as petroleum feedstocks become scarce and alternative energy sources such as nuclear power encounter political resistance or technological problems.

While high grade energy sources are in short supply, low grade energy sources, such as spent industrial cooling water, power plant waste heat, solar energy, and naturally occuring temperature gradients, are abundant. Since by definition such low grade energy sources involve relatively low temperature differentials, Carnot efficiencies are low. As a result, existing technology for utilization of such low grade energy sources is limited.

In the 1960's researchers began to recognize the potential of certain shape memory materials in the conversion of such low grade energy sources to useful mechanical power. Such shape memory materials exhibit a narrow transition temperature range above and below which separate crystalline states apparently exist. Once annealed to a particular shape, these materials may be readily deformed while below the transition temperature range. Upon subsequent reheating to above the transition temperature range, the material returns to its original shape, exerting higher stresses upon return than was required for low temperature deformation. The reversible cycle thus completed may potentially be used to do useful work.

While several alloys and bimetallic combinations are known to exhibit such shape memory characteristics, the most promising results to date have been produced with alloys containing near stoichiometric ratios of titanium and nickel. The advantages of such NiTi alloys, known commonly as 55-Nitinol, for low grade energy conversion systems stem primarily from an inherently narrow transition temperature range and secondarily from an ability to shift the transition temperature range up or down by minor composition changes.

Many systems for utilizing 55-Nitinol have been proposed since its unique properties were disclosed, including systems using stretchable 55-Nitinol belts, assymmetric rotating wheels with 55-Nitinol spokes, and crankshafts driven by 55-Nitinol elements. However, all of these systems result in low energy density; i.e., low amount of shape memory elements per unit volume which are exposed to the hot and cold fluids thereby resulting in relatively low power output.

One means of increasing the energy density is disclosed in U.S. Pat. No. 4,197,708 granted Apr. 15, 1980 to Milton, Jr. et al. However this disclosure fails to maintain separation of the hot and cold fluids, thereby resulting in considerable loss of thermal efficiency. In addition, the use of coiled spring load limiters result in relatively large spacing between the shape memory elements. That is, the projected area of a coiled spring load limiter may be two or three orders of magnitude greater than the area of a small diameter shape memory element wire, which then results in large voids surrounding the elements. To maximize the energy density, the void area around the shape memory elements should be on the same order as the shape memory element cross-sectional area.

Accordingly the primary object of my invention is to provide for an increase in the energy output of the device per unit volume.

Another important object of the instant invention is to provide for separation of the hot and cold fluids.

Another object of my invention is to include a load limiter to limit the stresses on the shape memory elements and also which permits high energy density from the device.

Further objects and advantages of my invention will become apparent from a consideration of the drawings and ensuing description thereof.

SUMMARY OF THE INVENTION

The applicant proposes a device for the conversion of low grade thermal energy into mechanical energy consisting of a plurality of shape memory material connected to the crank pins of a crank shaft, the crankshaft incorporating passages therethrough adapted for and directing heating and cooling fluids. The passages of the crankshaft further cooperate with a sprayer head such that the heating and cooling fluids may be directed to the shape memory elements at predetermined positions on the rotational cycle of the crankshaft.

A low temperature strain is induced in the shape memory elements followed by high temperature stress whereby rotation of the crankshaft may be sustanied and useful work produced. The shape memory elements further cooperates serially with a means of limiting the stress on the shape memory elements.

By utilizing a plurality of parallel, thin shape memory element plates coupled with fluid injection from a sprayer head, the applicant succeeds in providing maximum heat transfer surfaces for the shape memory elements while providing even temperature control across the individual elements.

A sprayor head is attached to the crankshaft wherein hot and cold fluids are directed through the crankshaft to the sprayer head and then to the shape memory elements. The shape memory elements when heated result in large loads on the crankshaft and large stresses on the elements. To prevent over stressing the elements when heated, stress limiters are provided in the form of a moveable piston. Pressure is maintained across the piston surface and when the piston pressurized force is exceeded, the piston lifts off from a support wall, thereby preventing overstressing of the shape memory elements.

The invention includes an additional feature in the form of heating the attachments of the shape memory elements at both ends. That is, the attachments are generally more massive than the shape memory elements and therefore do not respond thermally as rapidly to the hot and cold fluids. As a result, the ends or attachments to the shape memory elements are generally in the transition temperature range during the thermal cycling. This will cause the ends of the shape memory elements to become overstressed when the main portion of the shape memory elements is heated. To prevent overstressing of the shape memory elements at the attachment points, said attachments are continously heated. That is, the attachments are maintained at a temperature above the transition temperature and therefore, said attachments are maintained in a physical phase which will accept the high stresses.

BIREF DESCRIPTION OF THE DRAWINGS

DETAILED DESCRIPTION OF THE DRAWINGS

Figure 1:
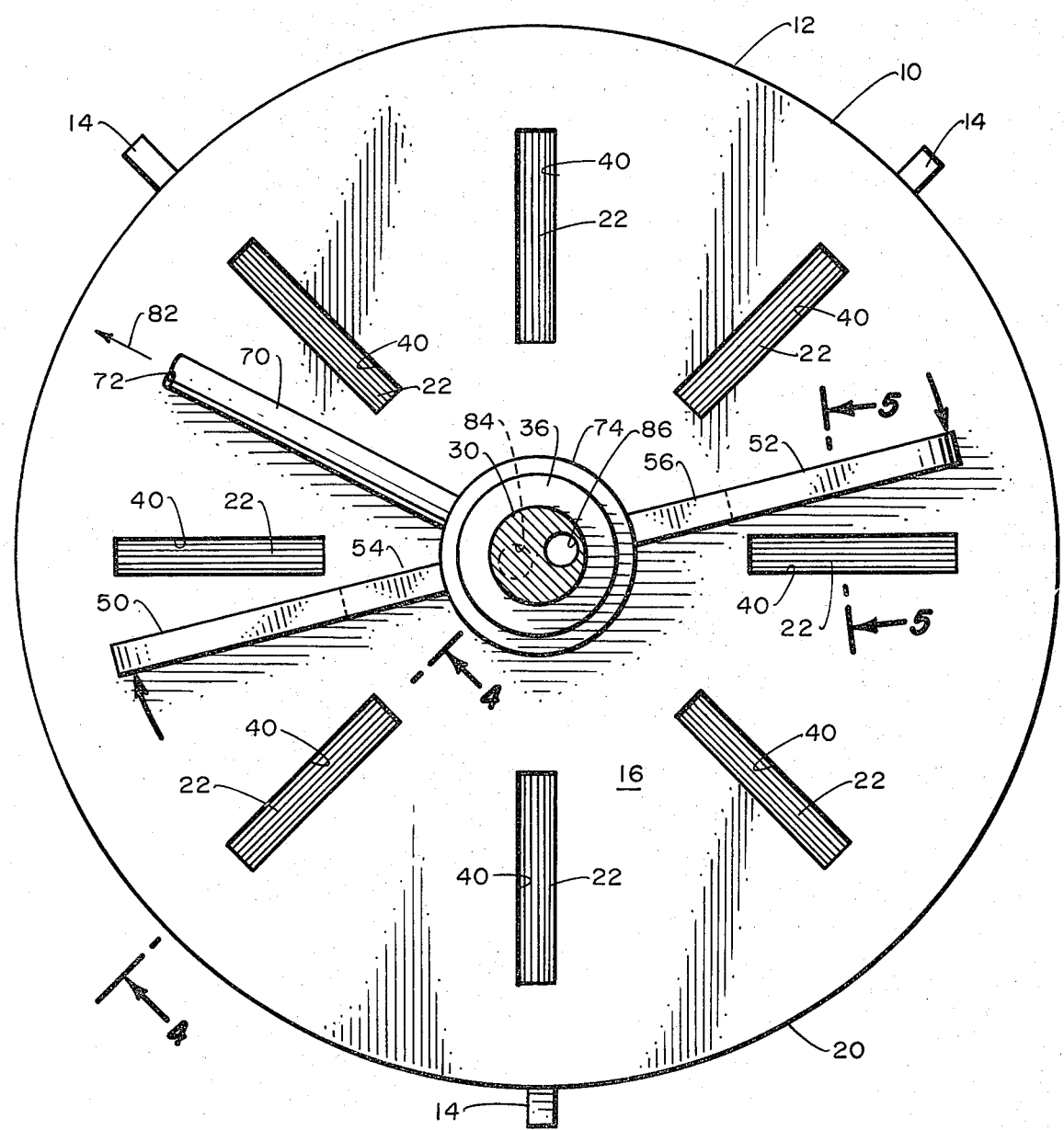
FIG. 1 is a top view showing the engine of the invention.
Figure 4:
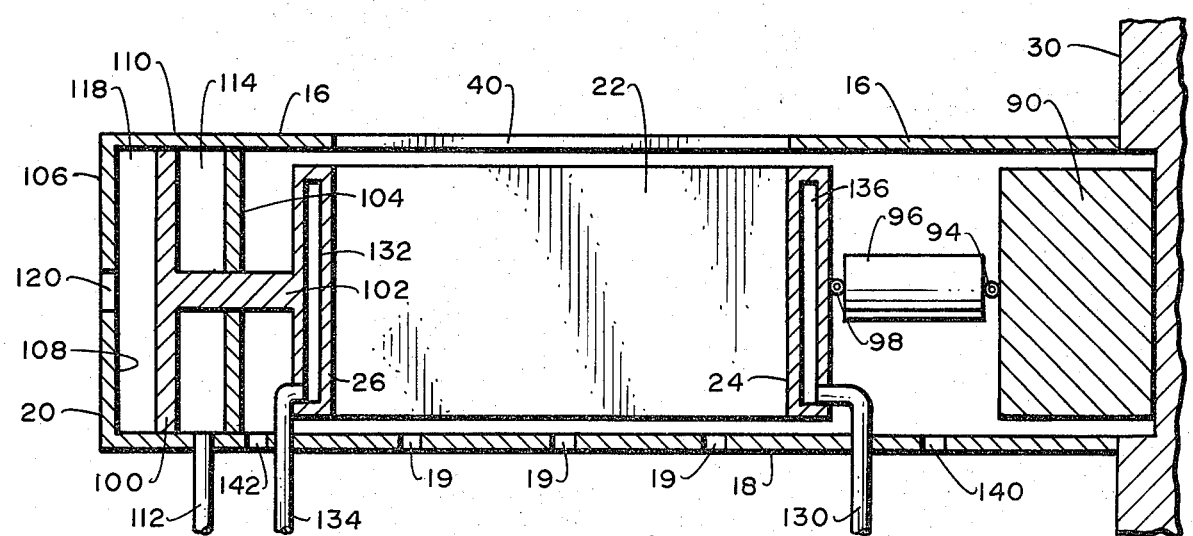
FIG. 4 is a cross-sectional view along line 4—4 of FIG. 1 showing the shape memory elements and the piston load limiter.
Figure 5:
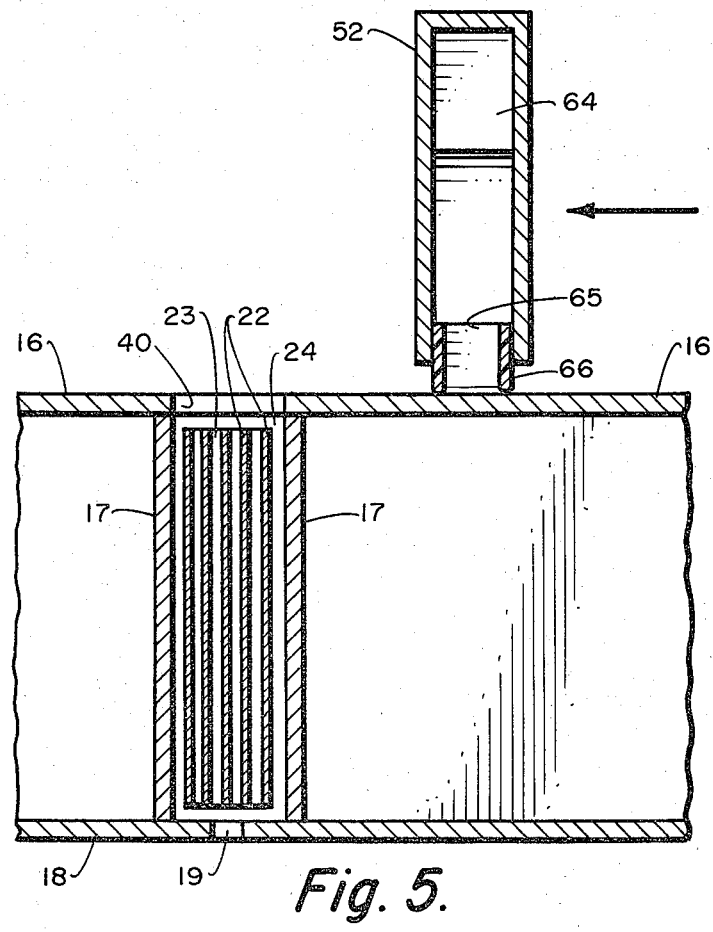
FIG. 5 is a cross-sectional view along line 5—5 of FIG. 1 showing the shape memory elements and sprayer head.

FIGS. 1, 4, and 5 show the shape memory element engine of this invention incorporating a plurality of shape memory elements 22, preferably constructed of 55-Nitinol having a transition temperature range chosen to respond to the maximum and minimum temperatures of the low grade thermal energy source to be utilized. The shape memory elements 22 are further preferably annealed to a plurality of thin plate configurations. Parallel plates of shape memory elements are chosen in order to provide maximum shape memory material per unit volume (energy density).

Header plates 24 and 26 are attached to each end of the shape memory elements 22. The inner header plate 24 is hingeably connected 98 to a connecting rod 96, which in turn is hingeably connected 94 to a generally circular crank pin bearing 90. The crank pin bearing 90 is attached 91 to the crank pin 32 of the crankshaft 30. The crankshaft 30 is supported by bearings 34 and 36.

Figure 3:
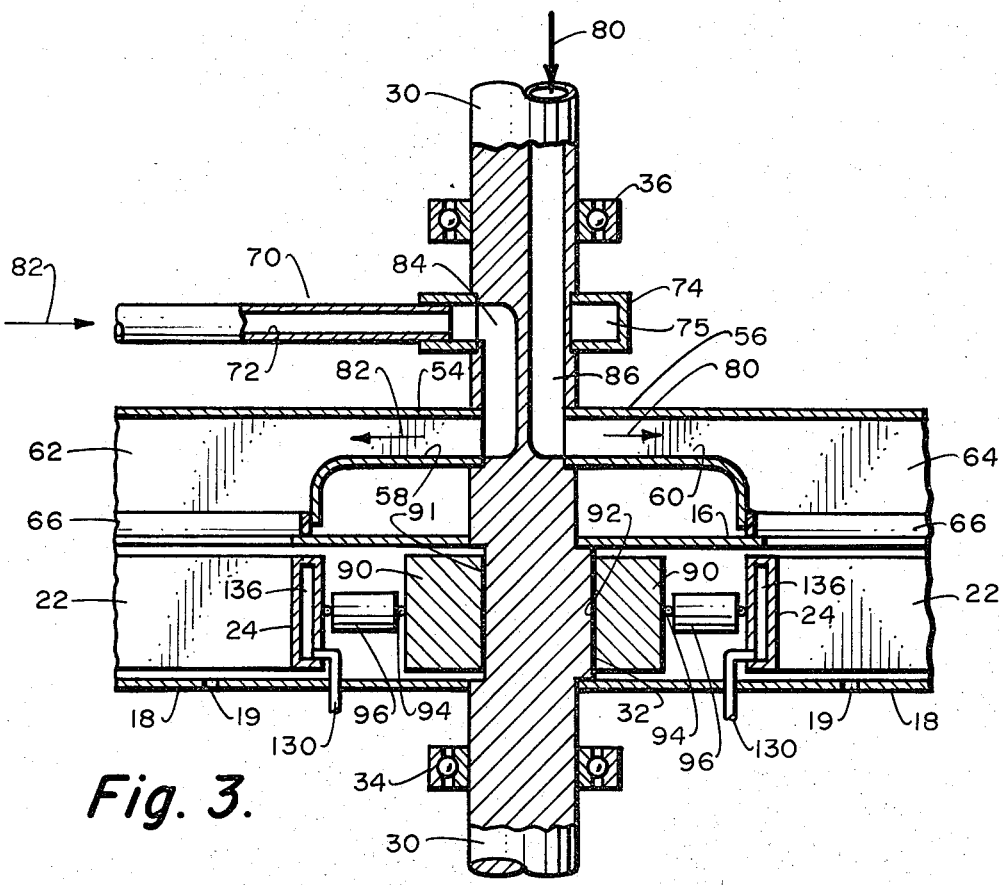
FIG. 3 is a sectional view of the crankshaft and fluid passageways.

In the crankshaft 30, fluid passageways 86 and 84 are provided for directing the hot and cold fluids to the sprayer heads 50 and 52 and which in turn direct the fluids to the shape memory elements 22. The sprayer heads 50 and 52 are attached to and rotate with the crankshaft 30. As shown in FIG. 3, fluid flows through one of the passageways as indicated by the arrows 80. The passageway 86 is connected to a sprayor head arm 56 which has an interior passageway 60. At the other end, this arm 56 is attached to the sprayer head 52. During operation, either the hot or cold fluid flows through the passageways 86 and 60 and is directed by the sprayer head 52 to the shape memory elements 22.

The other fluid is supplied to the crankshaft 30 through the tube interior 72 of a non rotating tube 70 and then to a hollow bearing 74. The plenum 75 within the bearing 74 connects to a passageway 84 within the crankshaft 30. This passageway 84 connects to the other sprayor head arm 54 which has an interior passageway 58. The fluid direction is indicated by the arrows 82. Either the cold or hot fluid is directed to the sprayer head 50 which in turn directs said fluid to the shape memory elements 22.

The passageways 84 and 86 may be drilled within a solid crankshaft or alternately, may be tubes within a hollow, tubular crankshaft 30. To prevent heat losses, the passageways 84 and 86 preferably should be insulated.

Surrounding and supporting the shape memory elements 22 is a housing 12, which has an upper surface 16, a lower surface 18, and a circular side 20. A plurality of openings 40 are included in the upper surface 16 over each set of shape memory elements 22. As each sprayor head 50 and 52 pass over each of the openings 40, the hot and cold fluids are directed to the voids 23 around the shape memory elements 22.

Referring now to FIG. 5, there is shown a cross-section of one of the sprayer heads 52 and the memory elements 22. Inside 64 of the sprayer head 52 contains either the hot or cold fluids. An opening 65 is provided in the sprayer head 52 for ejecting the fluid to the shape memory elements 22. To prevent fluid leakage as the sprayor head 52 runs along the housing upper surface 16, seals 66 are provided.

Figure 2:
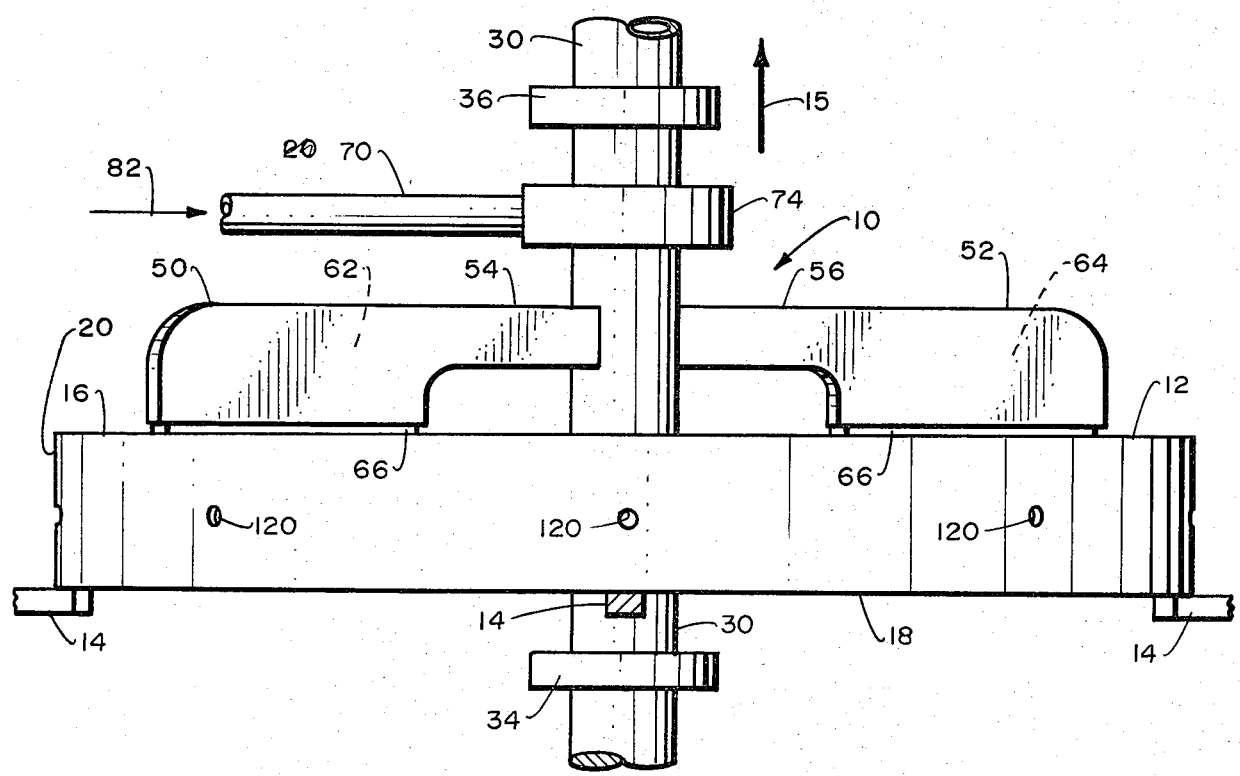
FIG. 2 is a side view of this invention.

In order to provide sufficient time for the shape memory elements 22 to absorb the thermal energy of the fluids, a plurality of small openings 19 are placed in the bottom surface 18 of the housing to restrict the fluid flow. However the openings 19 should be sufficiently large to allow elimination of the fluid before the other fluid is injected to the shape memory elements 22 through the other sprayer head 50. The upward orientation of this invention is indicated by the arrow 15 of FIG. 2. This orientation allows the fluids to flow through the opening 19 due to gravity.

Referring now to FIG. 4, a hot fluid is supplied to the interior passageways 132 and 136 within the shape memory header plates 24 and 26 through flexible insulated tubes 130 and 134. The function of the heated fluid is to ensure that the temperature of the attachments of the shape memory elements 22 to the header plates 24 and 26 are over the transition temperature when the shape memory elements 22 are heated (during the high stress phase). To allow for the hot fluid to flow through the header passageways 132 and 136, exits, not shown, will also be needed in the header plates. In addition, the header plates 24 and 26 should be insulated to reduce heat losses. The hot fluid used to heat the header plates 24 and 26 would generally be the same fluid that is used to heat the shape memory elements 22.

To reduce the fluid losses of the hot and cold fluids, the space between the header plates 24 and 26 and the adjacent walls 17 and 18 should be minimized or alternately seals should be provided, not shown. Since some fluid leakage will occur around the header plates 24 and 26, drainage holes 140 and 142 are provided.

To prevent overstressing of the shape memory elements 22 when said elements are heated to above its transition temperature, load limiters are provided. In the preferred embodiment, a moveable piston load limiter is used to prevent overstressing of the shape memory elements 22. As shown in FIG. 4, a moveable piston 100 is attached to the header plate 26 through the use of a piston rod 102. Around the piston 100 are fixed boundaries 108, 110, and 104. The volume 114 nearest the shape memory elements 22 is pressurized through a tube 112. The volume 118 on the other side of the moveable piston 100 is vented to the atmosphere through an opening 120.

Operationally, the cold fluid is directed to the shape memory elements 22 when the crank pin 32 is at a position nearest the load limiter. At this position, the piston 100 rest against the wall 108. As the crankshaft continues its rotation, the cold shape memory elements 22 are stretched, however the piston 100 remains against the wall 108 due to pressurization of the volume 114. When the crank pin 32 rotates to a position furtherest away from the load limiter, the hot fluid is directed towards the shape memory elements 22. As the shape memory elements 22 heat up, the element stress increases and when the pressurized force across the piston 100 is exceeded, the piston 100 lifts off from the wall 108 to prevent overstressing of the elements 22. The piston 100 remains lifted off from the wall 108 until the elements 22 are cooled to below their transition temperature.

To reduce the hard impact of the piston 100 against the wall 108 upon the return cycle, a shock absorber such as a spring, not shown, may be placed between said wall and the piston 100. Depending upon the characteristics of the shape memory elements employed, pressure or load modifications such as through the use of check valves or springs may also be employed, not shown, with the load limiters in order to vary the load across the piston 100.

As shown in the figures, one disk of shape memory elements are used to provide the power. Although not shown, additional disks of elements may be added, one above the other. For this configuration, plates should be placed between the disks to prevent fluids from falling upon the lower disks. One method of increasing the thermal efficiency of the instant invention would be to recycle the previously used fluids through additional sprayer heads to provide pre heating or pre cooling of the elements. As illustrated in the figures, two sprayer heads are used to direct the hot and cold fluids. The number of sprayer heads may be reduced to one by using a fan which blows cold or hot air over the shape memory elements to complete the cycle.

Figure 6:
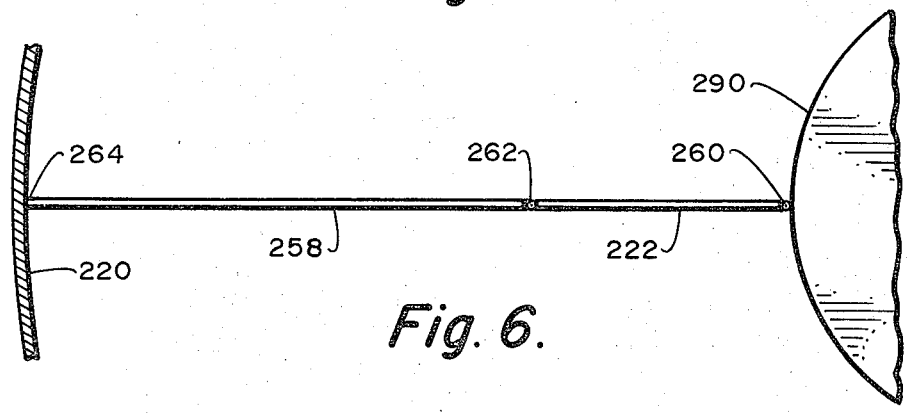
FIG. 6 is a view showing the shape memory element and an alternate load limiter which is in the form of a straight wire, bar, or plate.

An alternate means of providing load limiation to the shape memory elements is shown in FIG. 6. The load limiter shown in FIG. 6 is in the form of a straight elongated wire, or a bar, or a plate. The shape memory element 222 is hingeably connected 260 at one end to the crank pin bearing 290 and said elements 222 are attached 262 to the load limiters 258 at the other end. The load limiter 258 is connected 264 to the outside surface 220 of a housing. Since the typical elements 222 will undergo considerably greater length change during the thermal cycling than most metal material, the load limiter 258 will generally be considerably longer than the element 222. However, material such as bungee cord may be used to reduce the length of this load limiter 258. The load limiter 258 may be placed either radially outboard of the element 222, as shown, or inboard of the element 222. The load limiter 258 shown in FIG. 6 has the advantage of being much simplifier than the piston load limiter, however, this load limiter 258 requires much more space and therefore reduces the energy desnsity.

While the above description contains many specificities, these should not be construed as limitations on the scope of the invention, but rather as an exemplification of one preferred embodiment thereof. Accordingly, the scope of the invention should be determined not by the embodiment illustrated, but by the appended claims and their legal equivalents.

What is claimed is:

1. A mechanism for transforming heat energy into mechanical energy comprising:
   one or more deformably shape memory elements responsive to form change at a predetermined transition temperature;
   means for sequentially directing heating and cooling fluids to the surfaces of the shape memory elements whereby deformation of the shape memory elements may occur below said transition temperature and recovery may occur above said transition temperature;
   means of heating the ends or attachment points of said elements whereby the shape memory material at or near said ends or attachments will be assured of being above the transition temperature during the shape memory element recovery; and means attached to each element for deforming said element and for receiving and utilizing the energy output of each said element as it transfers through said transition temperature.

2. The apparatus of claim 1 wherein fluid passageways are included in the attachments to the shape memory element and a hot fluid is circulated through said passageways.

3. A mechanism for transforming heat energy into mechanical energy comprising:
   one or more deformably shape memory elements responsive for form change at a predetermined transition temperature;
   one or more sprayer heads, said sprayer heads rotate relative to the shape memory elements;
   a means of directing heating and cooling fluids through said sprayer heads whereby deformation of the shape memory elements may occur below said transition temperature and recovery may occur above said transition temperature; and
   means attached to each element for deforming said element and for receiving and utilizing the energy output of each said element as it transfers through said transition temperature.

4. The mechanism of claims 1 or 3 wherein load limiters are attached to one end of each shape memory element.

5. A mechanism for transforming heat energy into mechanical energy comprising:
   one or more deformably shape memory elements responsive to form change at a predetermined transition temperature;
   a shaft or crankshaft incorporating fluid passageways for transporting hot and cold fluid;
   means for sequentially directing heating and cooling fluids to the external surfaces of the shape memory elements whereby deformation of the shape memory elements may occur below said transition temperature and recovery may occur above said transition temperature; and
   means attached to each element for deforming said element and for receiving and utilizing the energy output of each said element as it transfers through said transition temperature.

6. A mechanism for transforming heat energy into mechanical energy comprising:
   one or more deformably shape memory elements responsive to form change at a predetermined transition temperature:
   a shaft or crankshaft incorporating fluid passageways for transporting hot and cold fluid;
   one or more sprayer heads for sequentially directing heating and cooling fluids to the surfaces of the shape memory elements, said sprayer heads being attached to and rotate with the shaft or crankshaft; and
   means attached to each element for deforming said elements and for receiving and utilizing the energy output of each said element as it transfers through said transition temperature.

* * * * *